United States Patent [19]

Seigeot

[11] Patent Number: 5,373,729

[45] Date of Patent: Dec. 20, 1994

[54] LEAK-DETECTION INSTALLATION FOR TESTING THE GASTIGHTNESS OF SEALED PACKAGES

[75] Inventor: Bertrand B. Seigeot, Dingy Saint Clair, France

[73] Assignee: Alcatel CIT, Paris, France

[21] Appl. No.: 223,764

[22] Filed: Apr. 6, 1994

[30] Foreign Application Priority Data

Apr. 8, 1993 [FR] France .................. 93 04191

[51] Int. Cl.⁵ .............................................. G01M 3/20
[52] U.S. Cl. ........................... 73/49.3; 73/40.7; 73/45.4
[58] Field of Search .............. 73/49.3, 45.4, 52, 40.7

[56] References Cited

U.S. PATENT DOCUMENTS

| | | | |
|---|---|---|---|
| 3,091,114 | 5/1963 | Webster | 73/49.3 |
| 3,591,944 | 7/1971 | Wilcox | 73/49.3 X |
| 3,744,210 | 7/1973 | O'Lenick et al. | 73/49.3 X |
| 3,857,278 | 12/1974 | Jenkins et al. | 73/49.3 X |
| 4,409,818 | 10/1983 | Wyslotsky et al. | 73/49.3 |
| 4,517,827 | 5/1985 | Tapscott | 73/45.4 |
| 5,029,463 | 7/1991 | Schvester et al. | 73/45.4 X |
| 5,111,684 | 5/1992 | Stauffer et al. | 73/49.3 |
| 5,249,454 | 10/1993 | Kollie et al. | 73/49.3 |

FOREIGN PATENT DOCUMENTS

| | | | |
|---|---|---|---|
| 2280892 | 2/1976 | France | 73/49.3 |
| 101727 | 5/1988 | Japan | 73/49.3 |

*Primary Examiner*—Thomas P. Noland
*Assistant Examiner*—Joseph W. Roskos
*Attorney, Agent, or Firm*—Sughrue, Mion, Zinn, Macpeak & Seas

[57] ABSTRACT

A leak-detection installation for testing the gastightness of flexible or rigid sealed packages containing a certain concentration of tracer gas, said installation including a belt conveyor, a bell-shaped cover situated above said conveyor and including drive means enabling said cover to be raised and to be lowered until it bears against the belt of said conveyor, said cover being connected to a tracer gas leak detector, the resulting assembly being controlled by control electronic circuitry, wherein said belt is made of a material that is both non-porous and non-perforated, and wherein the cover carries sealing means at its bottom periphery for cooperating with the belt of said conveyor to guarantee the gastightness of said cover when it is in the low position, wherein the cover is connected to a vacuum pump, and wherein a backing plate provided with a system of sealing rings is disposed under said belt and in alignment with said cover, said backing plate having a recess and being connected to said cover via a hose.

3 Claims, 3 Drawing Sheets

LEAK-DETECTION INSTALLATION FOR TESTING THE GASTIGHTNESS OF SEALED PACKAGES

The present invention relates to a leak-detection installation for testing the gastightness of sealed packages.

BACKGROUND OF THE INVENTION

Document EP-A-0 445 002 discloses an installation which includes a conveyor on which trays to be tested are disposed. Prior to sealing the trays, a small quantity of helium is inserted into each one of them. A hood is situated above the conveyor, which hood is connected to an extractor fan via a pipe. The hood can be moved vertically by means of actuators. When the presence of a tray is detected, the hood is lowered, and means secured to the hood exert a certain amount of pressure on the sealed tray. A sniffer probe connected to a helium leak detector is situated at the mouth of the pipe connecting the hood to the fan. If the air flow extracted by the fan contains helium, that indicates that there is a leak in the tray, and control apparatus actuates tray-removal means. Preferably, so as to detect any sealing defects in the bottom of the tray, the conveyor belt is perforated TO enable any gas leaking from the bottom to be entrained by the air flow caused by the fan.

That sniffer system, which operates at a pressure that is very close to atmospheric pressure, requires a certain amount of mechanical pressure to be exerted on the tray so that, in the event that the package is split, a leakage flow is created that is entrained by the air flow. Therefore, that method cannot be used on rigid packages.

When the packages contain fragile foodstuffs, such mechanical pressure exerted on the package may damage the food.

As stated above, the belt must be perforated so as to make it possible to detect any leaks in the bottom, but it may not be enough merely to provide a perforated belt. In the same way, the mechanical pressure, which is exerted by a plate, may prevent a leak from being detected, if the leak is situated in the top of the package under the pressure plate.

The sensitivity of that method is low. The tracer gas driving pressure created in the package by the mechanical means used is not properly controlled. The uniformity of the helium in the air flow created by the fan is not very good.

OBJECTS AND SUMMARY OF THE INVENTION

An object of the present invention is to mitigate those drawbacks, and the present invention provides a leak-detection installation for testing the gastightness of flexible or rigid sealed packages containing a certain concentration of tracer gas, said installation including a belt conveyor, a bell-shaped cover situated above said conveyor and including drive means enabling said cover to be raised and to be lowered until it bears against the belt of said conveyor, said cover being connected to a tracer gas leak detector, the resulting assembly being controlled by control electronic circuitry, wherein said belt is made of a material that is both non-porous and non-perforated, and wherein the cover carries sealing means at its bottom periphery for co-operating with the belt of said conveyor to guarantee the gastightness of said cover when it is in the low position, wherein the cover is connected to a vacuum pump, and wherein a backing plate provided with a system of sealing rings is disposed under said belt and in alignment with said cover, said backing plate having a recess and being connected to said cover via a hose.

In a particular embodiment, said means for guaranteeing the gastightness of said cover comprise two concentric sealing rings, and the system of sealing rings of said backing plate comprises two concentric sealing rings, a second vacuum pump being connected to the space between the sealing rings of said cover and to the space between the sealing rings of said plate.

Advantageously, when the cover is in the low position, a rigid surface that is secured to the cover, and whose outline matches the top portion of said package comes into the immediate vicinity of said top portion without compressing it. This is useful when the package is not mechanically strong enough to withstand the pressure differential during the gastightness test.

BRIEF DESCRIPTION OF THE DRAWINGS

An embodiment of the invention is described below with reference to the accompanying drawings, in which.

MORE DETAILED DESCRIPTION

Figure 1:
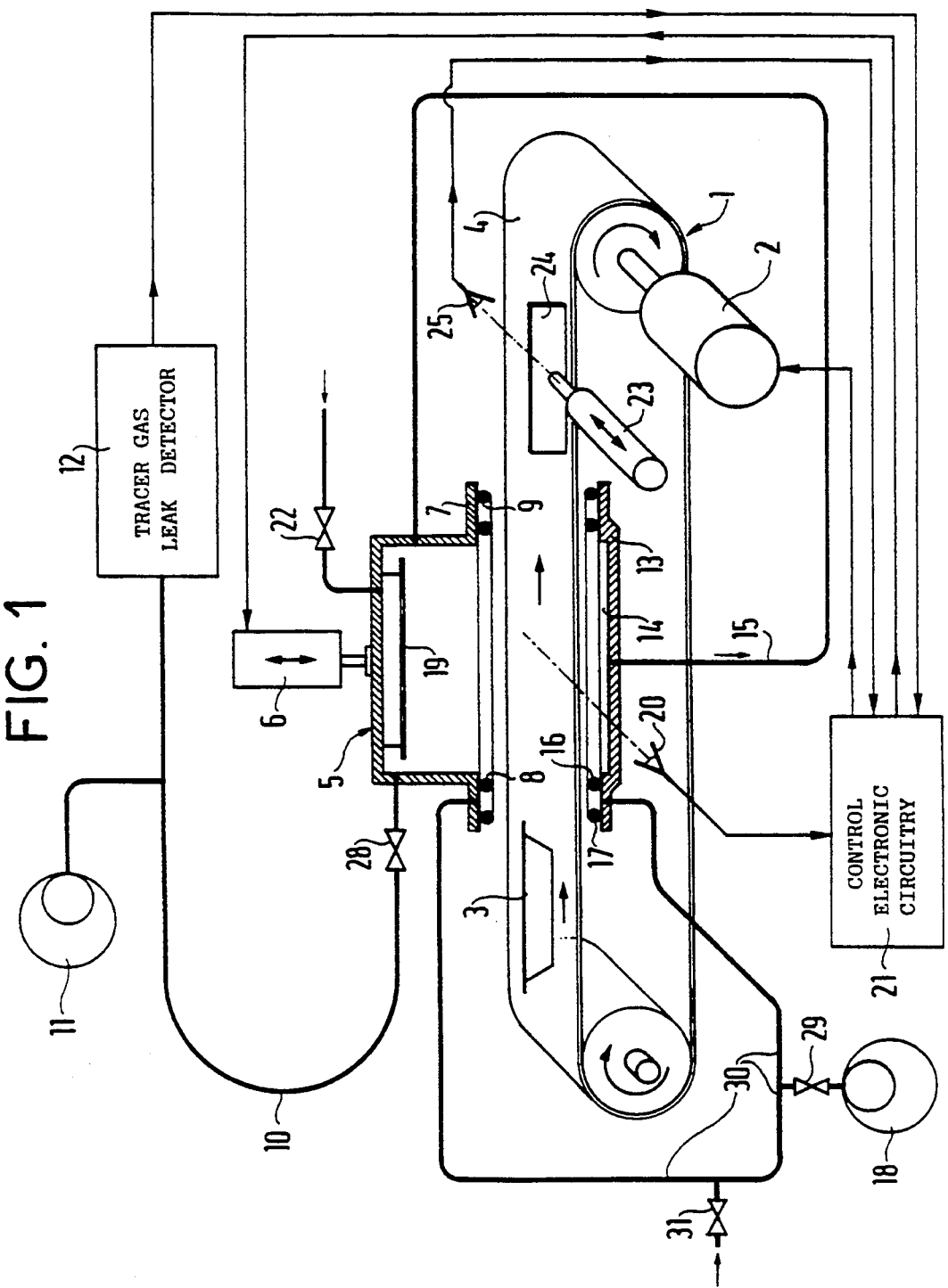
FIG. 1 is a diagram showing the overall installation of the invention.

FIG. 1, which diagrammatically shows the overall installation, shows a belt conveyor I driven by a motor 2. A tray 3 can be seen on the conveyor. For example, the tray contains foodstuff. The tray is closed at its top by a lid that is sealed to the periphery of the tray. Before the lid is sealed to the tray, a tracer gas such as helium is inserted into the tray at a concentration of about 5%. The tray is merely one possible example of a package. The package may also be a flexible packet, or a semi-rigid rectangular box-like container. The belt 4 of the conveyor is a belt made of a continuous material that is both non-perforated and non-porous, e.g. an elastomer or stainless steel.

A bell-shaped cover 5 which may be displaced vertically by an actuator 6 is disposed above the conveyor 1. The actuator 6 enables the cover 5 to be lowered until it bears against the belt 4 of the conveyor.

The bottom periphery of the cover 5 is provided with a rim 7 which is equipped with two concentric O-rings 8 & 9. When the cover is in the low position, these sealing rings co-operate with the belt 4 of the conveyor to guarantee the gastightness of the cover.

The cover 5 is connected to a vacuum pump 11 via a hose 10. The cover is also connected to a tracer gas leak detector 12 via the same hose 10. For example, if the chosen tracer gas inserted into the trays, such as 3, is helium, the leak detector is a helium leak detector.

To avoid distortion of the top run of the belt 4 when the cover is in the low position, and when the vacuum pump 11 is switched on to evacuate the cover 5, a backing plate 13 is disposed under the top run of the belt 4. The backing plate 13 is provided with a recess 14 which is connected to the cover 5 via a hose 15.

Two concentric O-rings 16 & 17 guarantee the gastightness of the backing plate 13 against the belt 4.

The backing plate 13 is not absolutely necessary if the material of the belt is rigid enough. The spaces between the sealing rings 8 & 9 of the cover 5 and between the sealing rings 16 & 17 of the backing plate 13 are connected to a second vacuum pump 18 which is independent from vacuum pump 11.

To prevent the tray 3 from ballooning or even bursting while the cover 5 is being evacuated, if need be, the cover is provided with a retaining plate 19. When the cover is in the low position, the height of the retaining plate relative to the top run of the belt 4 corresponds to the height of the tray when the tray is in the rest state. In this way, while the cover is being evacuated, the retaining plate 19 prevents the tray from ballooning.

Before the cover is evacuated, the plate exerts no pressure on the tray, and there may even be a small amount of clearance therebetween. The plate may optionally be perforated.

In the example described, where the tray 3 has a flat top lid closing it, the retaining plate 19 is flat. However, generally speaking, it is sufficient to use a rigid surface whose outline matches the top portions of the packages or packaging to be tested, if they are not mechanically strong enough.

A cell 20 connected to control electronic circuitry 21 for controlling the whole installation detects the arrival of a tray 3.

The circuit 21 then causes the motor 2 to stop and the cover 5 to be lowered by the actuator 6. In this way, the cover 5 constitutes a gastight test chamber.

Vacuum pump 11 and vacuum pump 18 are then started up and, when the pressure under the cover 5 is low enough, the detector 12 starts up. Once the test has been performed, valves 28 and 29 close, the test chamber and the spaces between the respective sealing rings are brought back to atmospheric pressure by opening air inlet valves 22 and 31, the cover 5 is raised and the band conveyor starts up again.

If the detector 12 detects a leak, the control electronic circuitry 21 causes an actuator 23 to actuate a package-removal member 24 as soon as the defective package has been detected by a cell 25.

The installation of the invention offers excellent sensitivity that is much higher than that of an installation operating in sniffer mode as in the above-mentioned prior art. The sensitivity obtained may easily be ten thousand times better.

Moreover, the installation enables a test to be performed in which the sensitivity does not depend on the location of the leak in the package: there is a much higher degree of certainty that the leak will reach the detector even if the leak is situated under the tray or between the retaining plate 19 and the top lid closing the tray.

However, if desired, the installation makes it possible to produce less suction under the cover 5, and to use the detector 12 in sniffer mode by connecting it to a sniffer probe inserted into the hose 10 connecting the cover 5 to the vacuum pump 11. The sensitivity is then lower, but the throughput is higher.

The following values are given by way of non-limiting example:

The trays 3 are cylindrical, and are made of plastic, and each tray is closed by an aluminium lid. The diameter is 185 mm and the height is 45 mm. The desired sensitivity corresponds to a 10 micron hole over a length of 1 mm, and the test throughput is 600 per hour. The cover 5 is cylindrical with radial clearance relative to the tray of 1 cm. The pump 11 used has a nominal capacity of 36 $m^3$/hour. The final pressure under the cover is 10 mbars, at which pressure the detector 12 can start testing.

Naturally, the installation can be used to test both non-rigid packages and rigid packages.

Since the packages are not mechanically compressed to produce tracer gas driving pressure, the foodstuffs are not crushed. The driving pressure is provided by the vacuum produced under the cover.

Figure 2:
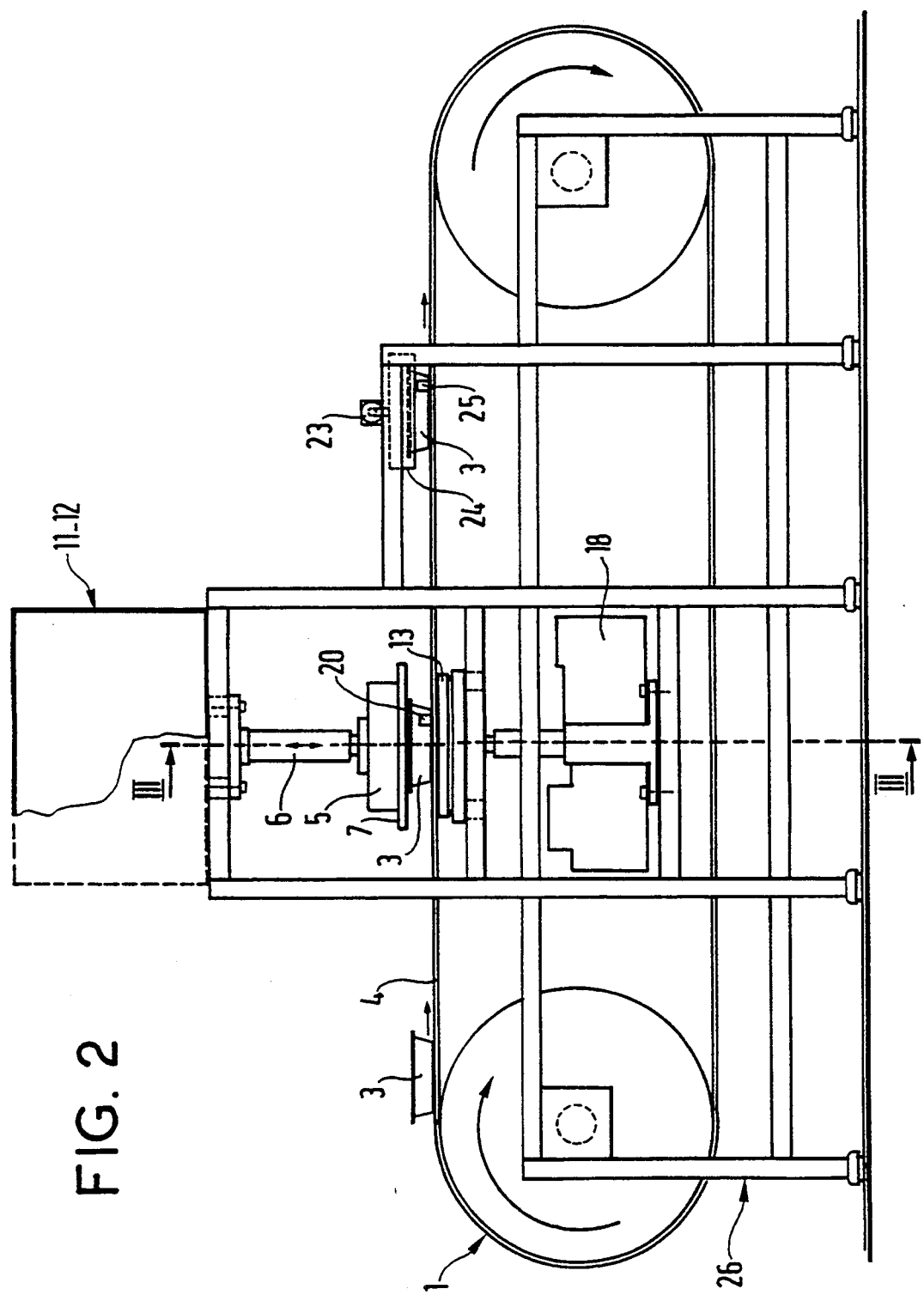
FIGS. 2 and 3 show the cover and the belt conveyor with its supporting framework, FIG. 2 being an elevation view and FIG. 3 being a view in section on III—III of FIG. 2.
Figure 3:
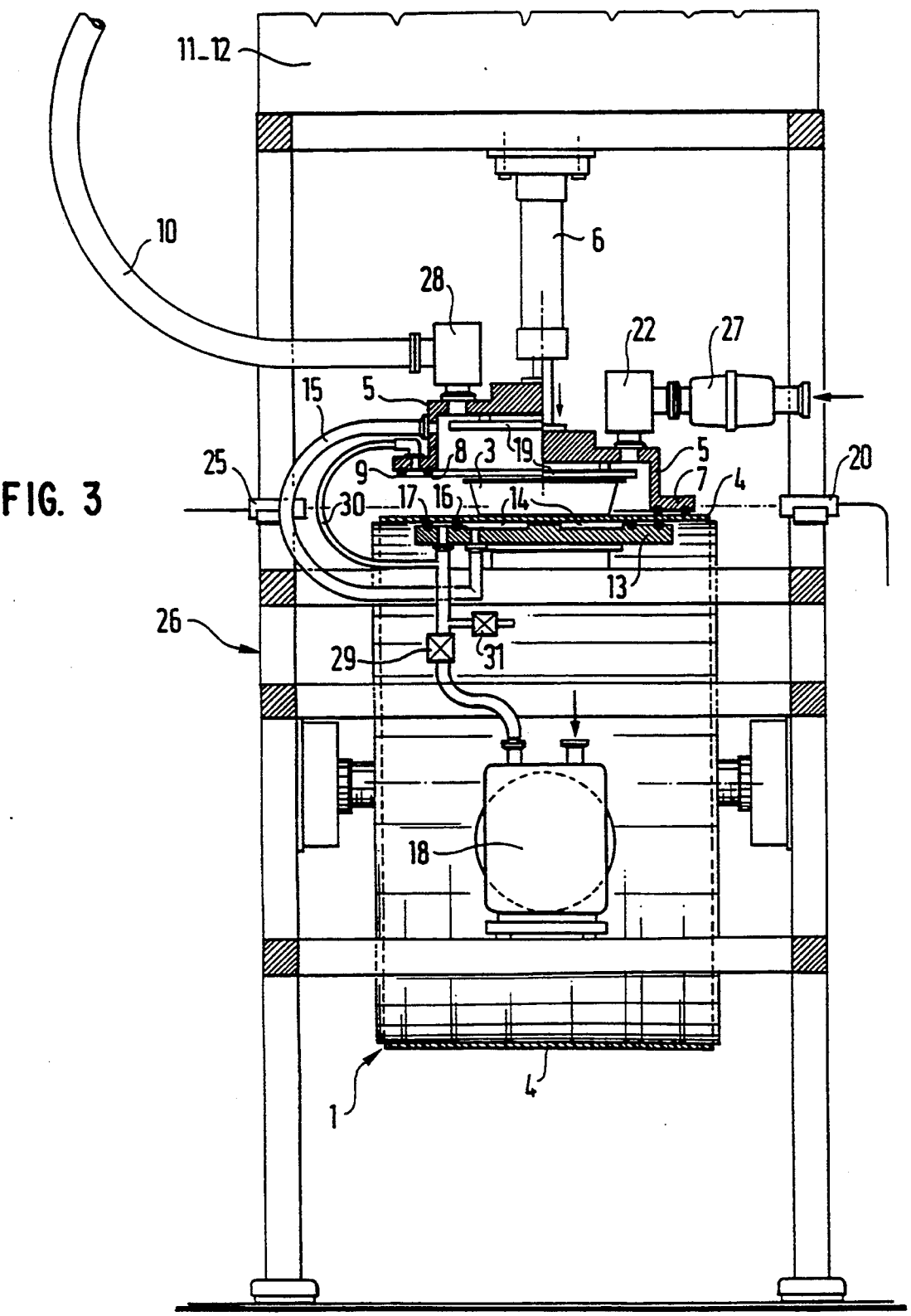

FIGS. 2 and 3 offer a more practical insight into the installation. The references used in these figures correspond to the members referenced in FIG. 1.

FIGS. 2 and 3 show a frame 26 which supports the entire installation and which is not shown in FIG. 1.

In FIG. 2, the detector 12 and the vacuum pump 11 are situated in the top portion of the frame 26, and are merely represented by a rectangle.

FIG. 3 stops at the top of the frame 26 without showing the rectangle representing the pump and the detector. Therefore, the hose 10 to which the pump and the detector are connected is shown only in part.

In FIG. 3, the air inlet valve 22 is equipped with an air inlet filter 27. The hose 10 is equipped with an isolation valve 28. The vacuum pump 18 is equipped with an isolation valve 29, and is connected to the space between sealing rings 8 & 9 and to the space between sealing rings 16 & 17 via a hose 30 equipped with an air inlet valve 31.

In the right-hand portion of FIG. 3, the cover 5 is shown in the low position, and in the left-hand portion of FIG. 3, the cover is shown in the high position.

I claim:

1. A leak-detection installation for testing the gastightness of flexible or rigid sealed packages containing a certain concentration of tracer gas, said installation including a belt conveyor, a bell-shaped cover situated above said conveyor and including drive means enabling said cover to be raised and to be lowered until it bears against the belt of said conveyor, said cover being connected to a tracer gas leak detector, the resulting assembly being controlled by control electronic circuitry, wherein said belt is made of a material that is both non-porous and non-perforated, and wherein the cover carries sealing means at its bottom periphery for co-operating with the belt of said conveyor to guarantee the gastightness of said cover when it is in the low position, wherein the cover is connected to a vacuum pump, and wherein a backing plate provided with a system of sealing rings is disposed under said belt and in alignment with said cover, said backing plate having a recess and being connected to said cover via a hose.

2. An installation according to claim 1, wherein said means for guaranteeing the gastightness of said cover comprise two concentric sealing rings, wherein the system of sealing rings of said backing plate comprises two concentric sealing rings, and wherein a second vacuum pump is connected to the space between the sealing rings of said cover and to the space between the sealing rings of said plate.

3. An installation according to claim 1, wherein, when the cover is in the low position, a rigid surface that is secured to the cover, and whose outline matches the top portion of said package comes into the immediate vicinity of said top portion without compressing it.

* * * * *